United States Patent
Mitomi et al.

(10) Patent No.: US 7,532,777 B2
(45) Date of Patent: May 12, 2009

(54) OPTICAL FUNCTIONAL DEVICES

(75) Inventors: Osamu Mitomi, Nagoya (JP); Yuichi Iwata, Nagoya (JP); Jungo Kondo, Nishikamo-Gun (JP); Kenji Aoki, Ichinomiya (JP); Tetsuya Ejiri, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 1 day.

(21) Appl. No.: 11/842,327

(22) Filed: Aug. 21, 2007

(65) Prior Publication Data
US 2008/0050082 A1 Feb. 28, 2008

(30) Foreign Application Priority Data
Aug. 25, 2006 (JP) .............. 2006-229213

(51) Int. Cl.
G02F 1/035 (2006.01)
G02B 6/10 (2006.01)
(52) U.S. Cl. .............. 385/2; 385/3; 385/129
(58) Field of Classification Search .......... 385/129, 385/27, 28, 3, 130, 2
See application file for complete search history.

(56) References Cited

U.S. PATENT DOCUMENTS

| | | | | |
|---|---|---|---|---|
| 5,129,017 | A * | 7/1992 | Kawano et al. | 385/3 |
| 6,512,866 | B1 * | 1/2003 | Fan et al. | 385/27 |
| 6,674,949 | B2 * | 1/2004 | Allan et al. | 385/129 |
| 7,054,524 | B2 * | 5/2006 | Miller | 385/28 |
| 7,298,949 | B2 * | 11/2007 | Gothoskar et al. | 385/130 |
| 2002/0118941 | A1 | 8/2002 | Notomi et al. | |
| 2007/0009219 | A1 | 1/2007 | Hatsuda et al. | |

FOREIGN PATENT DOCUMENTS

| | | |
|---|---|---|
| JP | 2002-350657 A1 | 12/2002 |
| JP | 2003-156642 A1 | 5/2003 |
| JP | 2005-070163 A1 | 3/2005 |
| JP | 2005-172932 A1 | 6/2005 |

OTHER PUBLICATIONS

U.S. Appl. No. 11/750,515, filed May 18, 2007, Mitomi et al.
Tao Chu et al., "Thermooptic Switch Based on Photonic-Crystal Line-Defect Waveguides," IEEE Photonics Technology Letters, vol. 17, No. 10, Oct. 2005, pp. 2083-2085.
Susumu Noda, *Recent Progresses and Future Prospects of Two-Dimensional and Three-Dimensional Photonic Crystals*, Applied Physics, vol. 74, No. 2 (2005), pp. 147-158.

* cited by examiner

*Primary Examiner*—Frank G Font
*Assistant Examiner*—Robert Tavlykaev
(74) *Attorney, Agent, or Firm*—Burr & Brown

(57) ABSTRACT

An optical functional device has a slab type two-dimensional photonic crystal layer. The photonic crystal layer has a dielectric layer and a plurality of lattice columns each comprising dielectric pillars. A waveguide portion is provided in the photonic crystal layer. A ground electrode and a signal electrode are formed on the dielectric layer for applying a modulating voltage on light propagating in the waveguide portion. A layer of a high dielectric constant is laminated on the dielectric layer. A low dielectric portion is formed direct under the waveguide portion and the lattice columns 7A, 7B and 7C of at least first, second and third orders in distance with respect to said waveguide portion.

10 Claims, 20 Drawing Sheets

Appendix A

US 7,532,777 B2

OPTICAL FUNCTIONAL DEVICES

This application claims the benefit of Japanese Patent Application P2006-229213 filed on Aug. 25, 2006, the entirety of which is incorporated by reference.

BACKGROUND OF THE INVENTION

1. Field of the Invention

The present invention relates to an optical functional device utilizing a slab-type and two-dimensional photonic crystal.

2. Related Art Statement

An optical device utilizing a photonic crystal has a structure of repeating different two kinds of dielectric materials having different dielectric constants. According to such devices, the internal multiple reflection phenomenon is utilized to provide various kinds of devices having superior functions and of very small sizes. Since the principle of function of the device is based on multiple reflection phenomenon, the device properties have a strong dependency on frequency (wavelength) in the vicinity of a specific frequency. The frequency is decided upon the material (refractive index N) of a substrate for a photonic crystal and a length d of period of repetition of the photonic crystal structure. The dependency of the device on frequency is characteristic to the device. However, in the case that the device is used in a wide range of wavelength, the characteristics would turn to be a defect.

An optical waveguide utilizing a slab-type and two-dimensional photonic crystal is described, for example, in the following documents.

Japanese patent publication No. 2005-172932A
Japanese patent publication No. 2003-156642A
Japanese patent publication No. 2005-70163A
Japanese patent publication No. 2002-350657A Further, according to "IEEE PHOTONICS TECHNOLOGY LETTERTS" VOL. 17, No. 10, October 2005, pages 2083 to 2085, "Thermooptic Switch Based on Photonic-Crystal Line-Defect Waveguides", an optical waveguide of Mach-Zehnder type is formed in a slab type two-dimensional photonic crystal, as shown in FIG. 1. This device is of SOI type, ands its slab type two dimensional photonic crystal, insulating layer (buffer layer) and supporting body are made of silicon.

Further, it is disclosed a device of SOI type in "Applied Physics" vol. 74, No. 2 (2005), pages 147 to 158, "Recent progresses and future prospects of two-dimensional and three-dimensional photonic crystals" by Susumu NODA. According to this device, a slab-type and two-dimensional photonic crystal is provided on a silicon wafer through a buffer layer of silicon dioxide. A space is formed direct under a waveguide portion (See FIG. 3). This is not an optical modulator of Mach-Zehnder type.

For example, it is expected to realize a high-speed optical functional device by forming a traveling type electrode in a two-dimensional and trianglular lattice photonic crystal and inputting a high frequency signal onto the electrode from the outside.

SUMMARY OF THE INVENTION

The inventors have studied the relationship of the photonic crystal structure and the properties in detail. As a result, it was found that the optical group refractive index GNo, as well as the effective EO constant, rises near the edge of photonic band. Besides, the optical group refractive index of a modulator using a conventional Ti-diffusion bulk lithium niobate substrate takes a GNo of about 2.2 at a wavelength band of 1.5 μm. On the other hand, the effective refractive index Nm of microwave signal of traveling type electrode is proved to be about 2.0 in photonic crystal device applying a conventional device structure. In the case that the device is operated at a wavelength region of considerable effects of elevating the EO constant, GNo becomes considerably larger than 2. It is thus proved that the operating velocity is substantially limited due to the velocity mismatch of microwave and light wave.

An object of the present invention is to provide an optical modulator having superior properties as photonic crystal and capable of high-speed operation by improving the structure of the modulator.

The present invention provides an optical functional device comprising:

a slab type two-dimensional photonic crystal layer comprising a dielectric layer, a plurality of lattice columns each comprising dielectric pillars and a waveguide portion formed in the photonic crystal layer;

a ground electrode and a signal electrode provided on the dielectric layer and for applying a modulating voltage on light propagating in the waveguide portion;

a layer having a high dielectric constant and laminated on the dielectric layer; and a low dielectric portion opposing the waveguide portion and the lattice columns of at least first, second and third orders in distance with respect to the waveguide portion.

According to the present invention, the layer of a high dielectric constant is laminated onto the dielectric layer. It is thereby possible to considerably raises the effective refractive index Nm of signal wave propagating in the traveling type electrode and thus attain velocity matching of the refractive index of signal electrode and the optical group refractive index GNo. The modulation band can be thus widened. At the same time, the low dielectric portion is provided, to which lattice columns of at least first to third orders in distance with respect to the waveguide portion faces. It is thus possible to prevent leakage of light wave into the layer of high refractive index and to reduce the propagation loss of the light wave at a practical level. As described above, the present invention enables wide band modulation in a field of an optical modulator using a slab-type photonic crystal. The practical benefits in the industry are thus quite considerable.

DETAILED DESCRIPTION OF INVENTION

Figure 1:
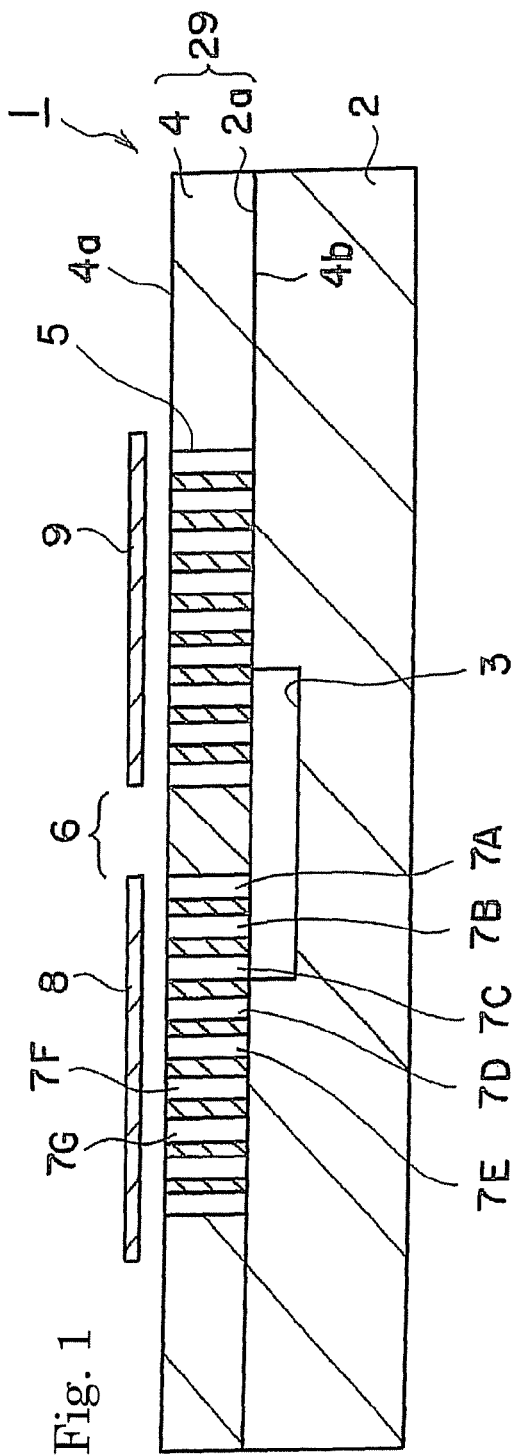
FIG. 1 is a cross sectional view schematically showing an optical functional device 1 according to an embodiment of the present invention.

A photonic crystal is a multi-dimension and periodic structure having a periodicity comparable with a wavelength of light with a plurality of media having different refractive indices. The photonic crystal has a band structure of light similar to that of electron. Specific structure thus provides photonic band gap of light. The photonic crystal having the photonic band gap functions as an insulator of light.

Linear defects can be introduced into a photonic crystal having photonic band-gap for deteriorating its periodicity. It is thereby possible to form waveguide mode in a frequency region of the band-gap and to provide an optical waveguide confining light.

A slab-type two-dimensional photonic crystal may be defined as follows. That is, to a dielectric thin film slab, low dielectric pillars are provided at an appropriate two-dimensional period. Each dielectric pillar has a refractive index lower than that of the dielectric thin film slab and has a shape of a column or an equilateral polygon. The dielectric thin film slab is provided between a upper clad and a lower clad to provide the photonic crystal. The upper and lower clads have a refractive index lower than that of the dielectric film slab.

In the case that the two-dimensional photonic crystal is used as an optical waveguide, it is necessary to confine light in the direction perpendicular to the two-dimensional plane. Several methods have been proposed for fabricating optical waveguides, and any method may be used in the present invention.

For example, so-called oxide clad two-dimensional slab-type photonic crystal is preferable because it is possible to easily produce the crystal of a large area. The oxide clad two-dimensional type photonic crystal is produced as follows. A thin film of a semiconductor of a high refractive index (refractive index of about 3 to 3.5) is formed on a dielectric material (oxide or polymer) of a low refractive index, in which a two-dimensional photonic crystal structure is fabricated.

Further, it may be produced a two dimensional slab photonic crystal of oxide clad type and of a high quality, by using a substrate of silicon dioxide ($SiO_2$) with a silicon (Si) thin film thereon. Such type of substrate is referred to as Silicon-On-Insulator (SOI).

To a material of a dielectric thin film slab, electro-optic crystals such as $LiNbO_3$, $LiTaO_3$, PLZT, KTN, $BaTiO_3$ and the like, silicon, germanium, gallium-arsenide series compounds, indium-phosphorous series compound or indium-antimony series compound may be added. Further, a dielectric pillar may be composed of silicon dioxide, polyimide series organic compound, epoxy series organic compound or acrylic series organic compound. The dielectric pillar is not necessarily a solid, and may be composed of a gas such as air or vacuum.

It is necessary that the dielectric pillars are arranged to form regular lattices. Although the shape of the lattice is not particularly limited, triangular lattice and regular quadratic lattice are listed.

The planar shape of the dielectric pillar is not particularly limited, and may be an equilateral polygon, exact circle, an ellipse or the like. Although the number of corners of the equilateral polygon is not limited, equilateral triangle, square, pentagon, hexagon or octagon is preferred. Further, the planar shape of the dielectric pillar may be made exact circle, production error is allowed. Specifically, the ratio of major axis/minor axis may preferably be 1.00±0.1 and more preferably be 1.0±0.05, considering limit and error of measurement, physical properties and anisotropy of etching rate upon processing of the material.

The group refractive index GNeff and effective EO constant are defined as follows.

$$GNeff = c/[Neff - \lambda \cdot (\Delta Neff/\Delta\lambda)]$$

(c: velocity of light in vacuum, $\lambda$; wavelength, Neff; effective refractive index of guided light)

Effective EO constant=amount of change of effective refractive index of guided light/amount of change of refractive index of substrate (bulk)

The change of refractive index of a substrate (bulk) may be realized by, for example, Pockels effect, TO effect (change of refractive index due to temperature change), plasma effect (change of refractive index due to injection of current into a semiconductor), and the like.

The optical waveguide structure of the present invention may be applied to various kinds of functional devices.

That is, in addition to conventional optical waveguide, the optical waveguide structure may be applied to a device utilizing Pockels effect, a device utilizing plasma effect caused by injection of current, a device utilizing EO effects due to quantum well structure, a device utilizing TO effects due to change of heater temperature, a directional coupler, Mach-Zehnder optical waveguide and an optical modulator.

The optical waveguide structure of the present invention is effective for electromagnetic waves. The above effects are thus obtainable for various kinds of electromagnetic waves other than light wave, by appropriately adjusting the substrate material and the period length d. Such electromagnetic waves include microwave and terahertz radiation.

The present invention will be described further in detail, referring to attached drawings.

FIG. 1 is a cross sectional view showing an optical functional device 1 according to an embodiment of the present invention.

A slab type and two-dimensional photonic crystal layer 29 has a dielectric layer 4 and lattice columns 7A, 7B, 7C and so on each having dielectric pillars formed in the dielectric layer 4. A plurality of the lattice columns form a column structure 5. In FIG. 1, the dielectric pillar is not formed between the lattice columns on the right and left sides to form a defect region, which constitutes a waveguide portion 6.

Ground electrodes 8 and a signal electrode 9 are formed on a upper surface 4a of the dielectric layer 4. In the case that the ground and signal electrodes and the dielectric layer directly contact each other, however, the leakage of the guided light into the electrodes would occur to result in an increase of the propagation loss of light, especially near the waveguide portion 6. According to the present example, the ground and signal electrodes are made distant from the dielectric layer 4 to form a space between the dielectric layer and the ground electrodes and between the dielectric layer and the signal electrode.

A method of forming the space between the dielectric layer and the ground and signal electrodes is not particularly limited. For example, the ground and signal electrodes may be formed on a separate substrate, which may be then fixed on a predetermined position. Alternatively, the ground and signal electrodes may be composed of thin plates, and each thin plate may be fixed at a predetermined position.

A layer 2 of a high dielectric constant is joined to and integrated with the back face 4b of the dielectric layer 4. A predetermined low dielectric layer 3 is formed on a upper face 2a of the layer 2 of high refractive index. The waveguide portion 6 faces the low dielectric portion 3. At the same time, the low dielectric portion 3 is present below the lattice columns 7A, 7B and 7C positioned at the first, second and third columns in distance with respect to the waveguide portion 6. According to the present example, the low dielectric portion 3 is not present and the layer 2 of high dielectric constant is provided under the lattice columns 7D, 7E, 7F and so on of the fourth order or more in distance with respect to the waveguide portion 6.

It is necessary to provide the low dielectric portion 3 under the lattice columns of the first, second and third order in distance with respect to the waveguide portion 6. The reason is as follows. Light propagating in the waveguide portion is proved to diffuse into the neighboring lattice columns 7A, 7B and 7C from the waveguide portion 6. In the case that the layer of high dielectric constant is provided direct under the waveguide portion 6 and the lattice columns, the leakage of light occurs to result in the propagation loss of light. According to the inventor's study, it is proved that the low dielectric portion is needed under the lattice columns, especially of the first to third orders in distance with respect to the waveguide portion 6.

It is not indispensable to provide the low dielectric portion under the lattice columns of the fourth order or more in distance with respect to the waveguide portion. On the viewpoint of propagation efficiency of light, however, it is preferred to provide the low dielectric portion under the lattice column of the fourth orders in distance with respect to the waveguide portion, and it is more preferred to provide the low dielectric portion under the lattice columns of the fourth and fifth order in distance with respect to the waveguide portion. On the other hand, as the low dielectric portion becomes larger, the effective refractive index of the signal wave propagating in the electrode is lowered. On the viewpoint, it is preferred to reduce the size of the low dielectric portion.

Figure 2:
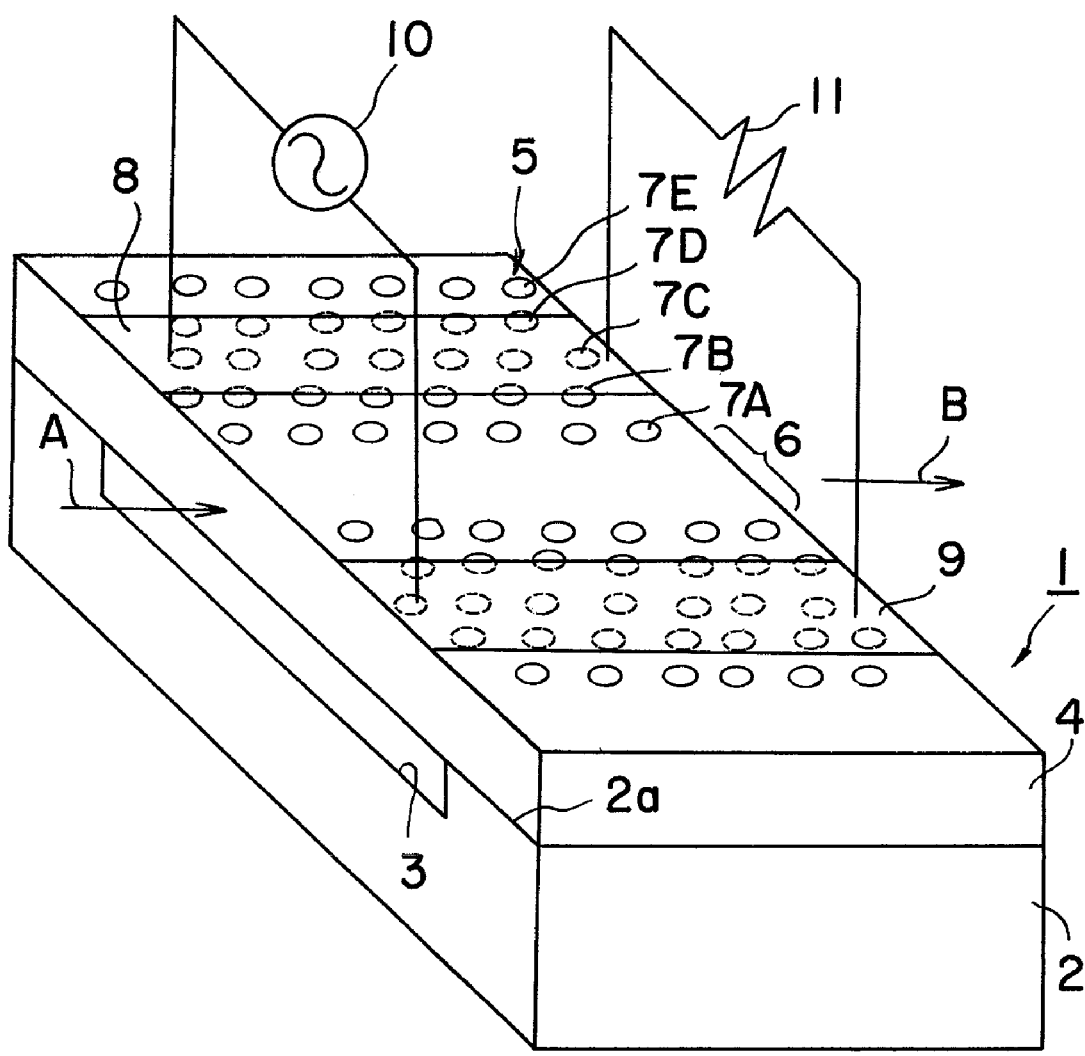
FIG. 2 is a perspective view schematically showing an optical functional device 1.

As schematically shown in FIG. 2, a modulating voltage is applied on the ground electrodes 8 and the signal electrode 9 from an alternating current power source 10. As shown in an arrow "A", fundamental light is made incident into the waveguide portion 6, modulated and then irradiated as an arrow "B". 11 represents a resistance.

Figure 3:
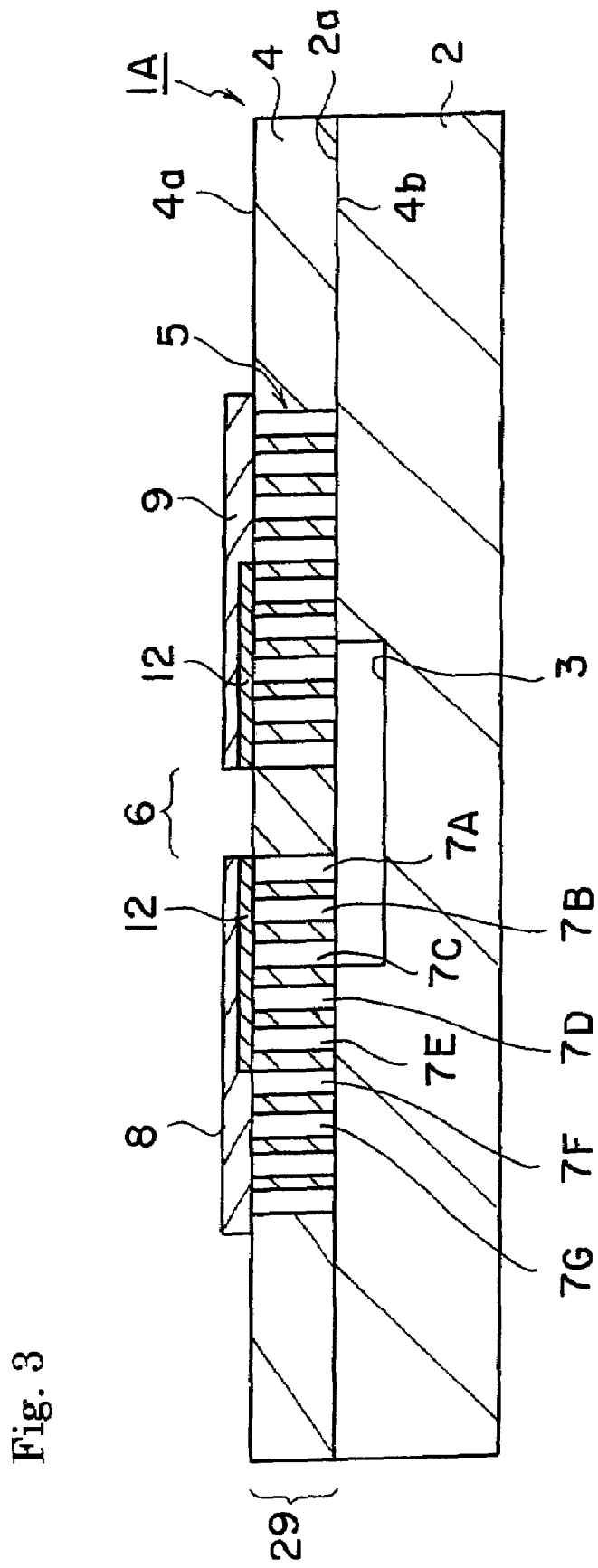
FIG. 3 is a cross sectional view schematically showing an optical functional device 1A according to another embodiment of the present invention.

According to a preferred embodiment, a buffer layer is provided between the dielectric layer and the ground electrode and the dielectric layer and the signal electrode. For example, according to a device 1A shown in FIG. 3, the ground electrode 8 and the signal electrode 9 are formed on a upper surface 4a of the dielectric layer 4. At the same time, a buffer layer 12 is formed between the dielectric layer and the ground electrode and between the dielectric layer and signal electrode, Although the buffer layer 12 may be formed over the whole face of the electrode, this is not indispensable. However, it is preferred to interpose the buffer layer over the lattice columns of the first to fifth order in distance with respect to the waveguide portion, since light tends to be diffused into the lattice columns of the first to fifth order.

The material of the buffer layer provided between the signal electrode and the dielectric layer and between the ground electrode and the dielectric layer is not particularly limited, and may be $SiO_2$ or a polymer.

The material of the layer of high dielectric constant is not particularly limited, may be the materials of the dielectric layer or the followings as the representative examples.

Figure 4A:
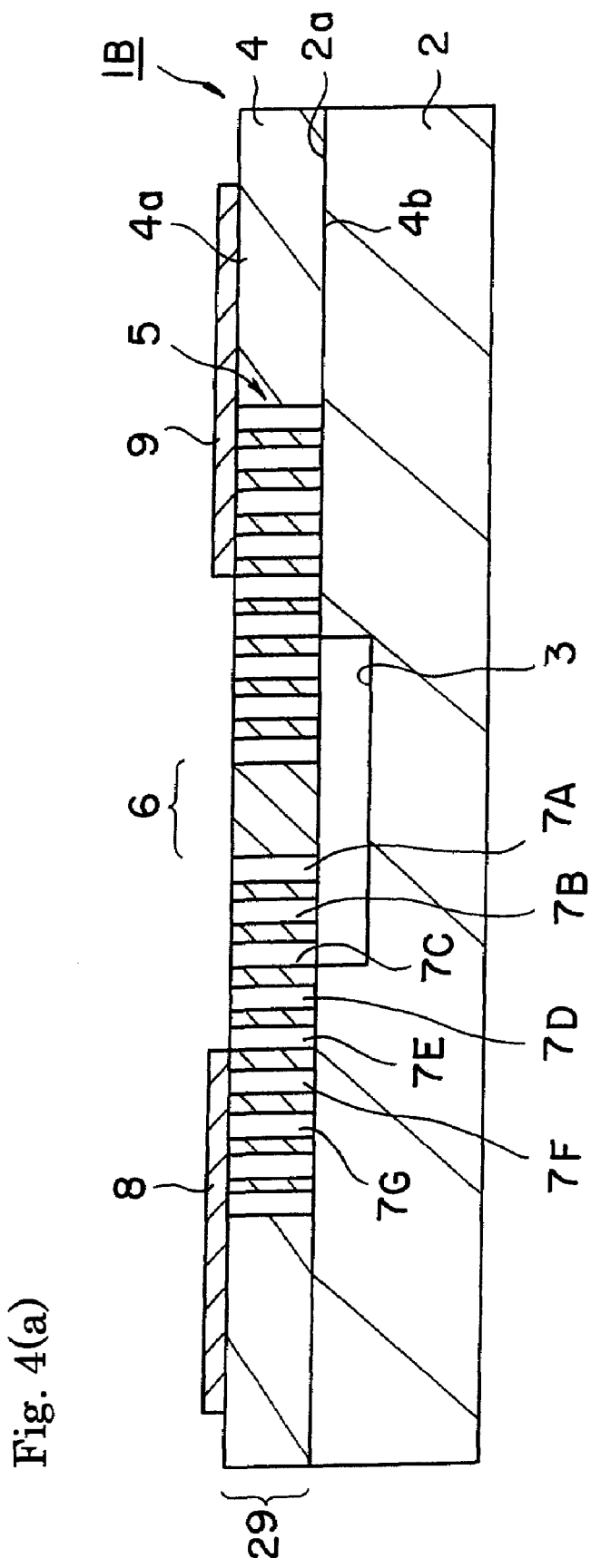
FIG. 4(a) is a cross sectional view schematically showing an optical functional device 1B according to still another embodiment of the present invention.

$\epsilon hs$=5 to 10: ceramics of $Al_2O_3+SiO_2$ series
$\epsilon hs$=10 to 100: ceramics of $Al_2O_3+SiO_2+BaTiO_3$ series
$\epsilon hs$=100 or more: ceramics of pseudo tungsten bronze structure, ceramics of tungsten bronze structure
Other: $BaTiO_3$ Further, according to a preferred embodiment, the ground and signal electrodes are not formed over the lattice columns of at least first to fifth orders in distance with respect to the waveguide portion, and the ground and signal electrodes are formed to cover the lattice columns of the sixth order or more in distance with respect to the waveguide portion. It is thus possible to prevent the leakage of light diffused from the waveguide portion into the electrodes. For example, according to a device 1B shown in FIG. 4(a), the ground and signal electrodes are not formed over the lattice columns 7A to 7E of the first to fifth orders in distance with respect to the waveguide portion 6. The ground and signal electrodes are formed over the dielectric layer 4 in the lattice columns 7F of the sixth order or higher order in distance with respect to the waveguide portion 6.

Further, according to a preferred embodiment, the lattice column is not provided under the ground and the signal electrodes. More preferably, the lattice columns of the sixth order or more in distance with respect to the waveguide portion are not provided. In this case, the ground and signal electrodes are formed in a region more distant than the lattice column of the fifth order in distance with respect to the waveguide portion, and the lattice column is not provided under the ground and signal electrodes.

Figure 4B:
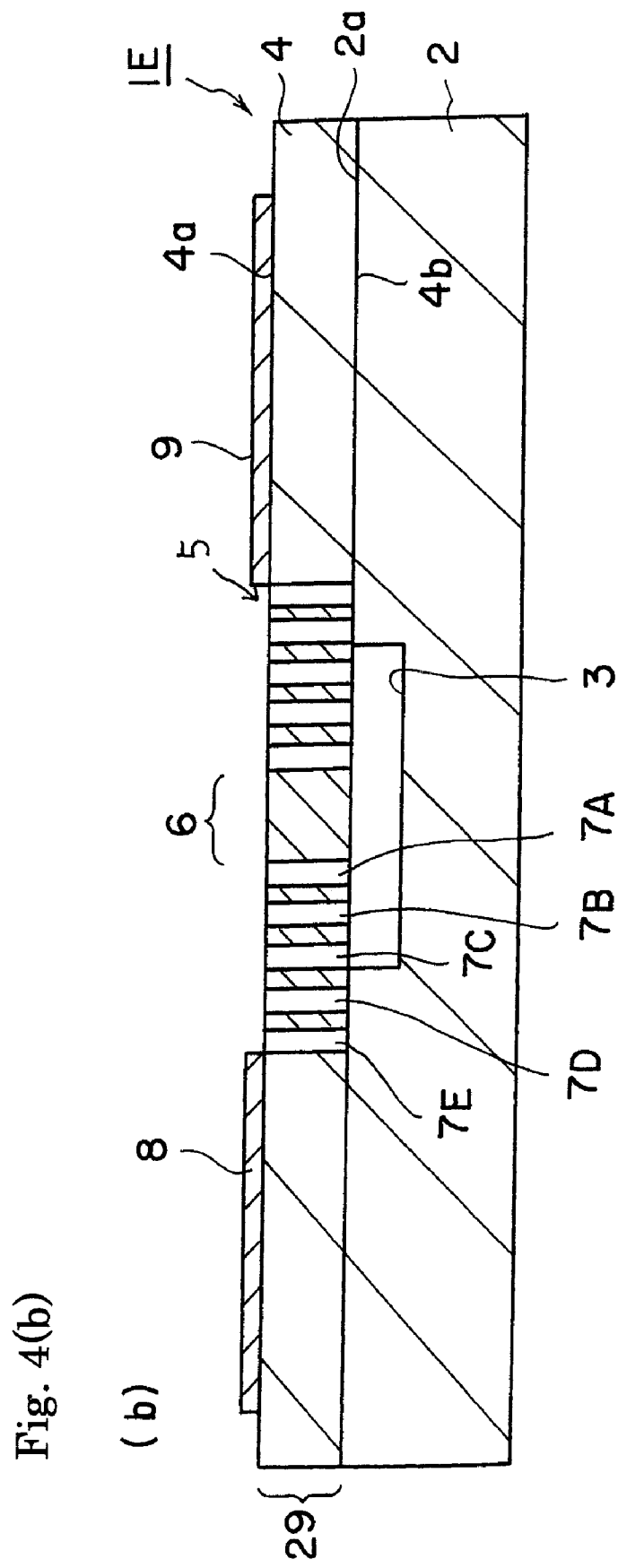
FIG. 4(b) is a cross sectional view schematically showing an optical functional device 1E according to still another embodiment of the present invention.

The guided light is condensed near the waveguide portion 6, depending on the wavelength range used. Therefore, in the case that the device is operated in such wavelength range, the intensity of the guided light is extremely low in a region more distant from the waveguide portion than the lattice column of the fifth order. The optical waveguide property would not be affected even if the lattice column is not provided in such region. Therefore, as a device 1E shown in FIG. 4(b), the lattice columns of the first to fifth orders are formed and the lattice columns of the sixth order or more are not formed, and the ground electrodes 8 and the signal electrode 9 may be positioned over the planar dielectric layer 4. In this case, the buffer layer is not provided under the electrodes, so that the effective application voltage applied on the dielectric layer is increased to improve the operational efficiency. Further, the electrodes can be formed on a flat plate with no lattice column thereon, so that a metal film forming the electrode can be easily produced and the film thickness can be controlled at a high precision.

According to the examples described above, the dielectric layer and the layer of high dielectric constant are formed as separate bodies. However, the dielectric layer and the layer of high dielectric constant are not needed to be separate bodies upon forming. A single slab substrate can be processed to form the dielectric layer and the layer of high dielectric constant. However, in this case, the dielectric layer and the layer of high dielectric constant are formed of the same material of the slab substrate.

Figure 5:
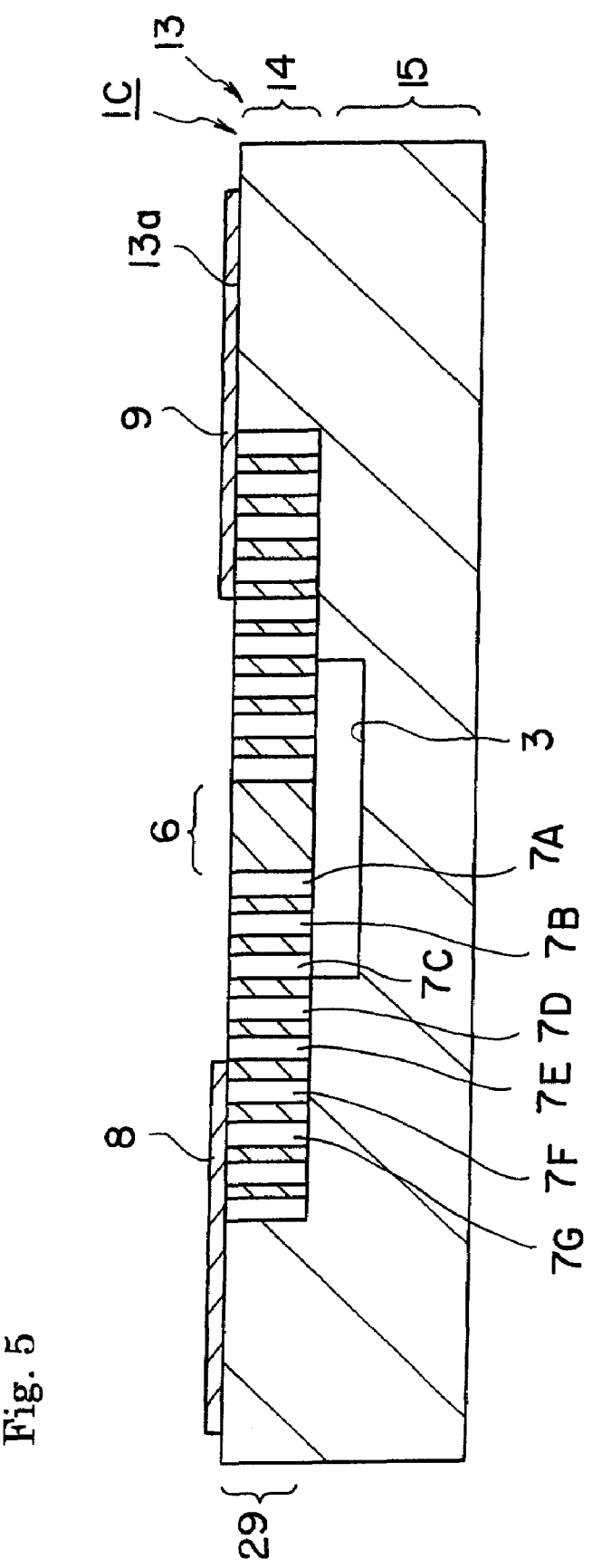
FIG. 5 is a cross sectional view schematically showing an optical functional device 1C according to still another embodiment of the present invention.

For example, according to a device 1C shown in FIG. 5, the dielectric layer 14 and the layer 15 of high dielectric constant are formed in a single slab body 13. The slab-type and two-dimensional photonic crystal layer 29 is composed of the dielectric layer 14 and the lattice columns 7A, 7B, 7C and so on each having dielectric pillars formed in the dielectric layer 14.

The ground electrode 8 and signal electrode 9 are formed on a side of a upper surface 13a of a substrate 13. The buffer layer may be formed between the dielectric layer and the ground electrode and between the signal electrode and dielectric layer. Alternatively, the ground and signal electrodes may not be formed over the lattice columns of at least the first to fifth orders in distance with respect to the waveguide portion. The layer 15 of high dielectric constant is provided direct under the lattice columns. The waveguide portion 6 faces the low dielectric portion 3. At the same time, the low dielectric portion 3 is present under the lattice columns 7A, 7B and 7C of the first, second and third orders in distance with respect to the waveguide portion 6. According to the present example, the low dielectric portion 3 is not present and the layer 15 of high dielectric constant is provided under the lattice columns 7D, 7E and so on of the fourth order or more in distance with respect to the waveguide portion 6.

Figure 6:
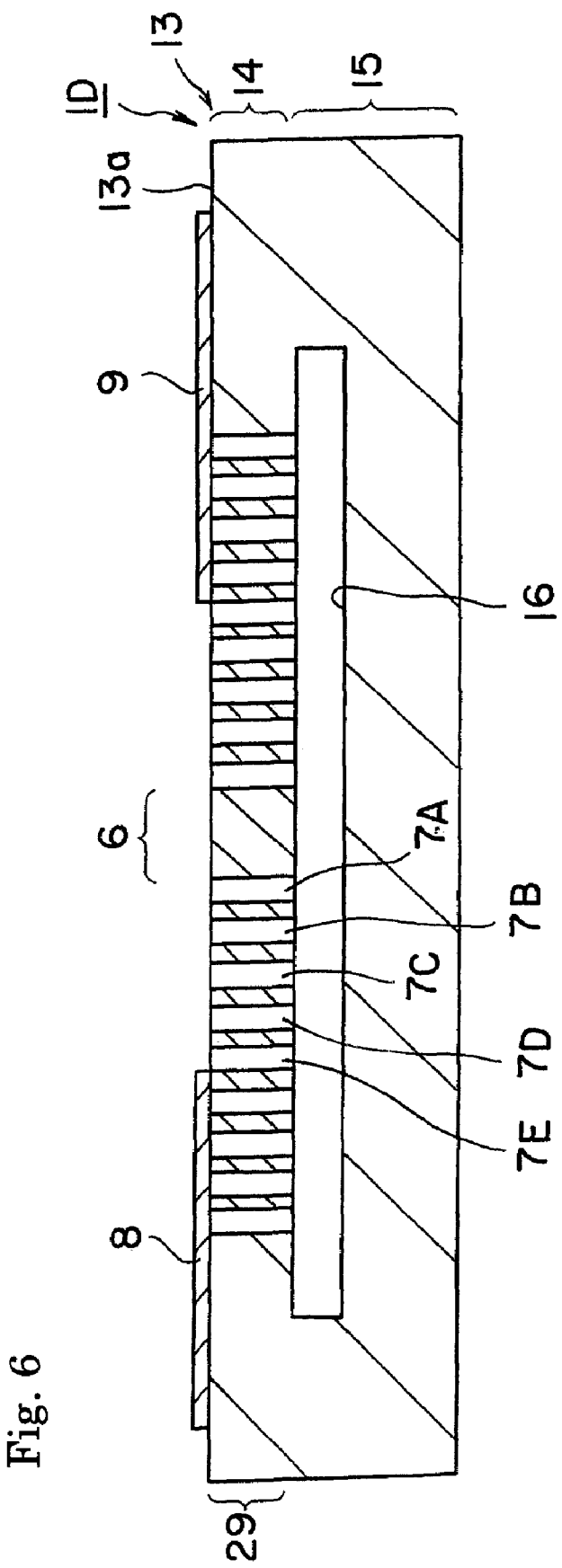
FIG. 6 is a cross sectional view schematically showing an optical functional device 1D according to still another embodiment of the present invention.

Further, according to a device 1D shown in FIG. 6, the width of the low dielectric portion 16 is enlarged. According to the present example, the low dielectric portion is provided direct under all the lattice columns, and each of the lattice columns faces the low dielectric portion 16. This embodiment is superior on the viewpoint of preventing the leakage of light propagating in the waveguide portion 6. However, the effective refractive index of the signal wave propagating in the electrodes is lowered.

Figure 7:
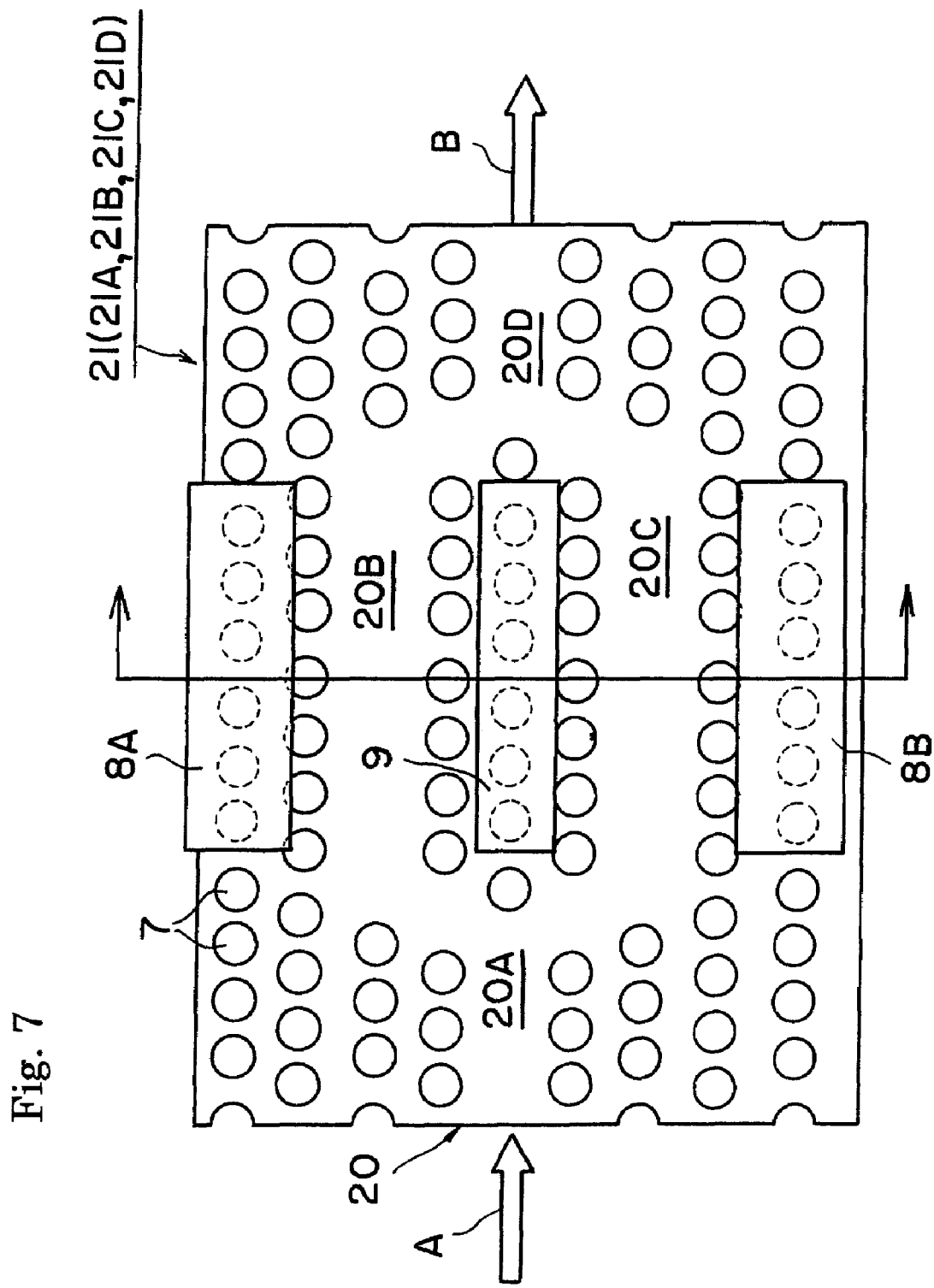
FIG. 7 are cross sectional views schematically showing optical functional devices 21 to 21D according to still another embodiments of the present invention.

It will be described an example of applying the optical functional device of the present invention to a device having an optical waveguide of Mach-Zehnder type. FIG. 7 is a plan view schematically showing the device according to this embodiment.

According to the present example, a waveguide portion 20 forms an optical waveguide of Mach-Zehnder type. That is, a waveguide portion 20A is formed on the side of incident light "A", and a waveguide portion 20D is formed on the side of outgoing light "B". A pair of branched waveguide portions 20B and 20C is formed between waveguide portions 20A and 20D.

The structure of each waveguide portion is constituted according to the present invention. It may be each of the structures shown in FIGS. 1 to 6 described above. FIGS. 8 to 12 are cross sectional views showing photonic devices of the present invention having waveguide structure of Mach-Zehnder type.

Figure 8:
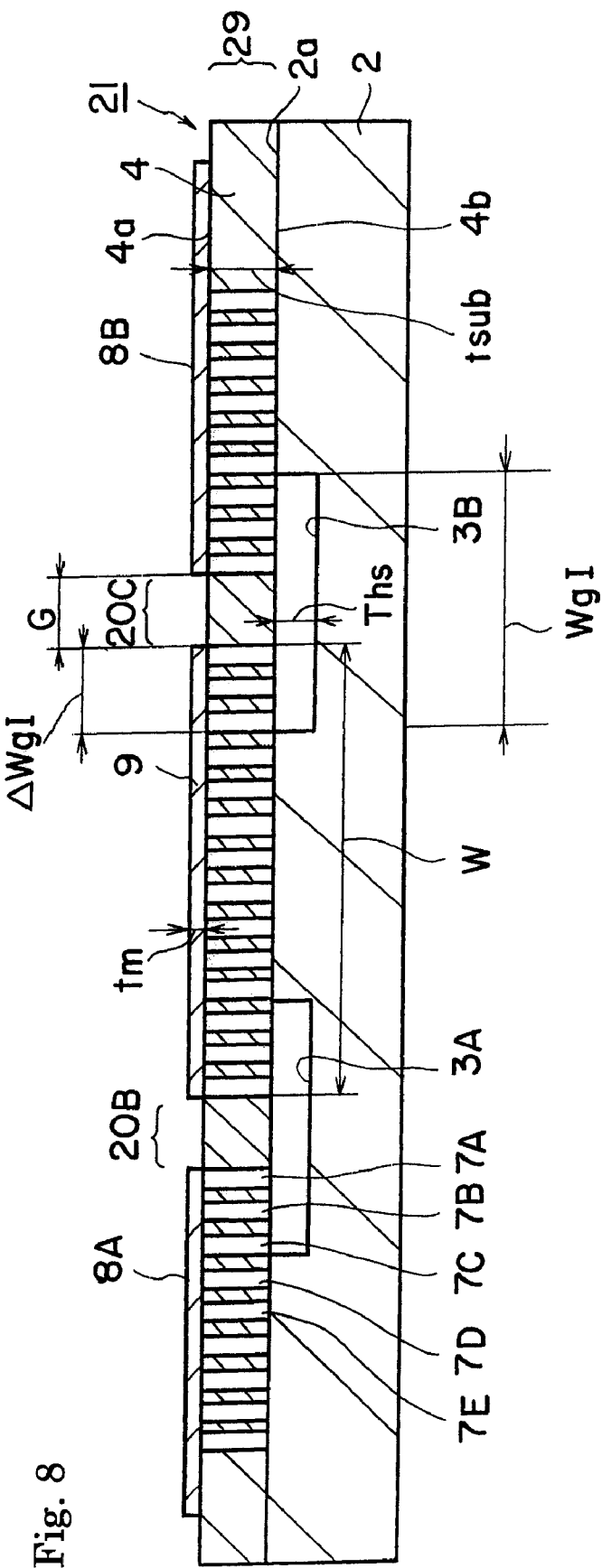
FIG. 8 is a cross sectional view schematically showing an optical functional device 21 according to still another embodiment of the present invention, having an optical waveguide of Mach-Zehnder type.

According to the device 21 shown in FIG. 8, the slab-type and two-dimensional photonic crystal layer 29 has the dielectric layer 4 and the lattice columns 7A, 7B, 7C and so on each having the dielectric pillars formed in the dielectric layer 4. In FIG. 8, the lattice columns are formed under the ground electrodes 8A and 8B and the signal electrode 9, respectively. Further, the waveguide portions 20B and 20C are formed between the ground electrode 8A and signal electrode 9 and between the ground electrode 8B and signal electrode 9, respectively.

The layer 2 of high dielectric constant is joined to and integrated with the side of back face 4b of the dielectric layer 4. Predetermined low dielectric portions 3A and 3B are formed on the side of the upper surface 2a of the layer 2 of high dielectric portion 3A. The waveguide portion 20B faces the low dielectric portion 3A and the waveguide portion 20C faces the low dielectric portion 3B. At the same time, the low dielectric portions 3A and 3B are present under the lattice columns 7A, 7B and 7C of the first to third orders in distance with respect to the waveguide portions 20B and 20C, respectively. According to the present example, the low dielectric portions 3 are not present and the layer 2 of high dielectric constant provided under the lattice columns 7D, 7E and so on of the fourth or higher order in distance with respect to the waveguide portions 20A and 20B, respectively.

Figure 9:
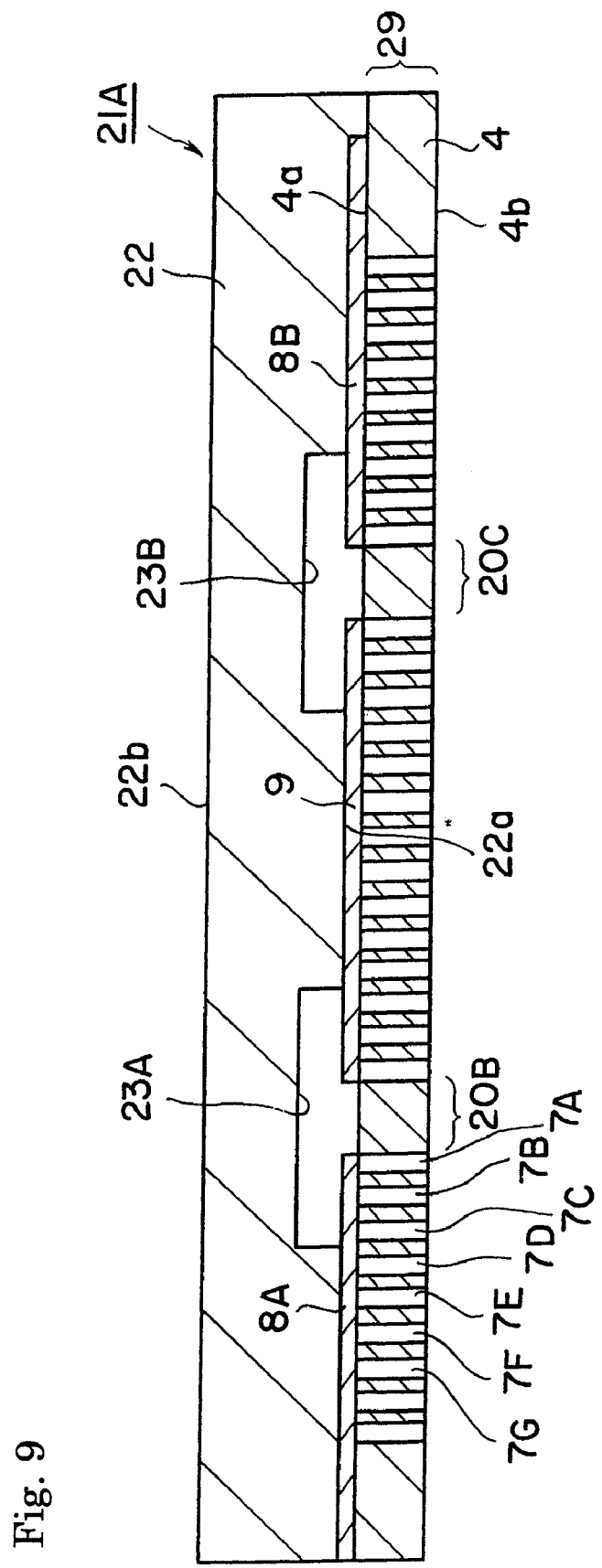
FIG. 9 is a cross sectional view schematically showing an optical functional device 21A according to still another embodiment of the present invention, having an optical waveguide of Mach-Zehnder type.

According to a device 21A of FIG. 9, the slab-type and two-dimensional photonic crystal layer 29 is composed of the dielectric layer 4 and the lattice columns 7A, 7B, 7C and so on each having the dielectric pillars formed in the dielectric layer 4. In FIG. 9, the lattice columns are formed under the ground electrodes 8A, 8B and the signal electrode 9, respectively. Further, the waveguide portions 20B and 20C are formed between the ground electrode 8A and signal electrode 9 and between the ground electrode 8B and signal electrode 9, respectively.

The layer 22 of high dielectric constant is joined to and integrated with the side of the upper surface 4a of the dielectric layer 4. The upper surface 22b of the layer 22 is flat, and predetermined low dielectric portions 23A and 23B are formed on the side of the lower surface 22a. The waveguide portion 20B faces the low dielectric portion 23A, and the waveguide portion 20C faces the low dielectric portion 23B. At the same time, the low dielectric portion is present under the lattice columns 7A, 7B and 7C positioned in the first to third columns with respect to the waveguide portions 23B and 23C, respectively. According to the present example, the low dielectric portion is not present and the layers 22 of high dielectric constant are provided over the lattice columns 7D, 7E and so on of the fourth order or more in distance with respect to the waveguide portions 20B and 20C, respectively.

Figure 10:
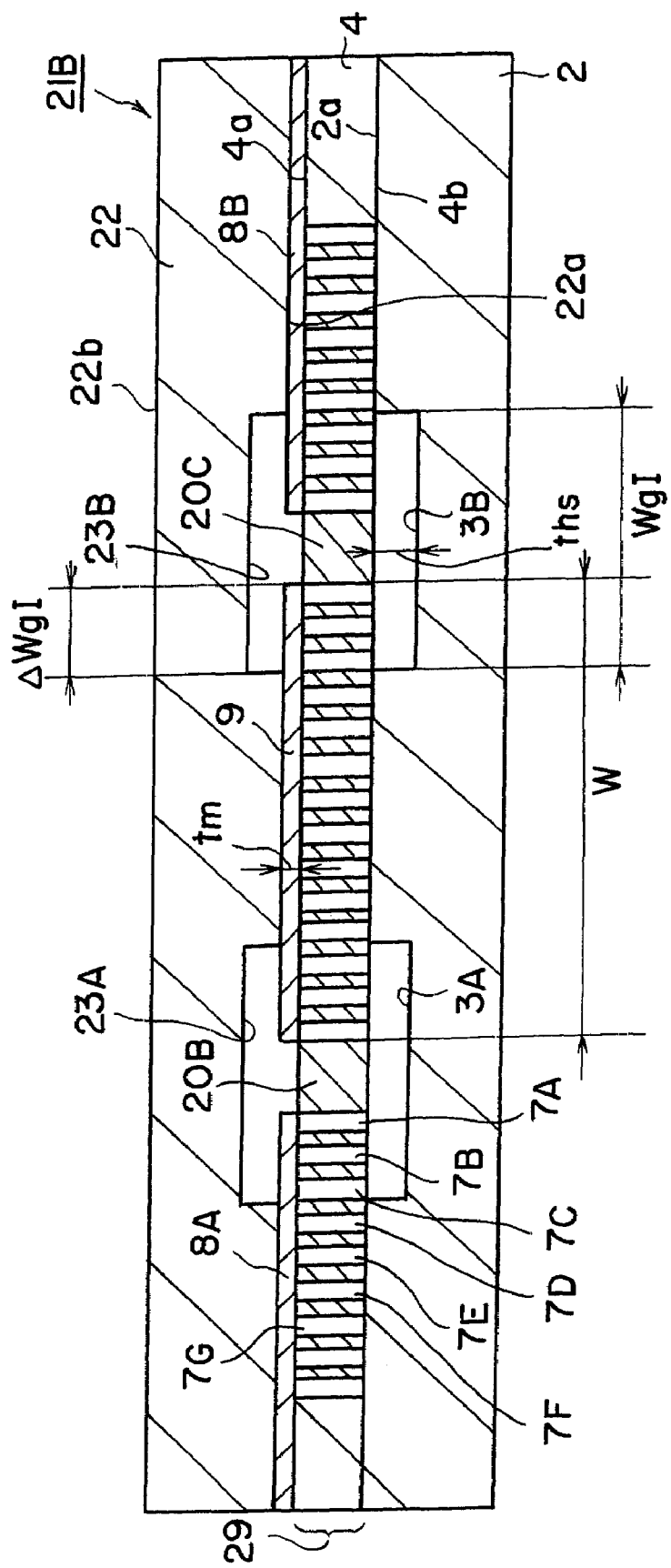
FIG. 10 is a cross sectional view schematically showing an optical functional device 21B according to still another embodiment of the present invention, having an optical waveguide of Mach-Zehnder type.

According to a device 21B of FIG. 10, the layer 22 of high dielectric constant is joined to and integrated with the side of the upper surface 4a of the dielectric layer 4. The upper surface 22b of the layer 22 is flat, and predetermined low dielectric portions 23A and 23B are formed on the side of the lower surface 22a. The waveguide portion 20B faces the low dielectric portion 23A, and the waveguide portion 20C faces the low dielectric portion 23B. At the same time, the low dielectric portions 23A, 23B are present under the lattice columns 7A, 7B and 7C positioned in the first to third columns with respect to the waveguide portions 20B and 20C, respectively. According to the present example, the low dielectric portions 23A, 23B are not present and the layers 22 of high dielectric constant are provided over the lattice columns 7D, 7E and so on of the fourth order or more in distance with respect to the waveguide portions 20B and 20C, respectively.

Further, the layer 2 of high dielectric constant is joined to and integrated with the side of the back face 4b of the dielectric layer 4. Predetermined low dielectric portions 3A and 3B are formed on the side of the upper face 2a of the layer 2 of high dielectric constant. The waveguide portion 20B faces the low dielectric portion 3B and the waveguide portion 20C faces the low dielectric portion 3B. At the same time, the low dielectric portions 3A and 3B are present under the lattice columns 7A, 7B and 7C positioned in the first to third columns with respect to the waveguide portions 20B and 20C, respectively. According to the present example, the low dielectric portions 3A and 3B are not present and the layers 2 of high dielectric constant are provided under the lattice columns 7D, 7E and so on of the fourth or higher order in distance with respect to the waveguide portions 20B and 20C, respectively.

Further, a separate supporting substrate may be provided in addition to the layer of high dielectric constant and then joined to and integrated with the layer of high dielectric constant. In this case, it is not required to form the supporting substrate with a material of a high dielectric constant. Materials of a low cost can be thus applied.

Figure 11:
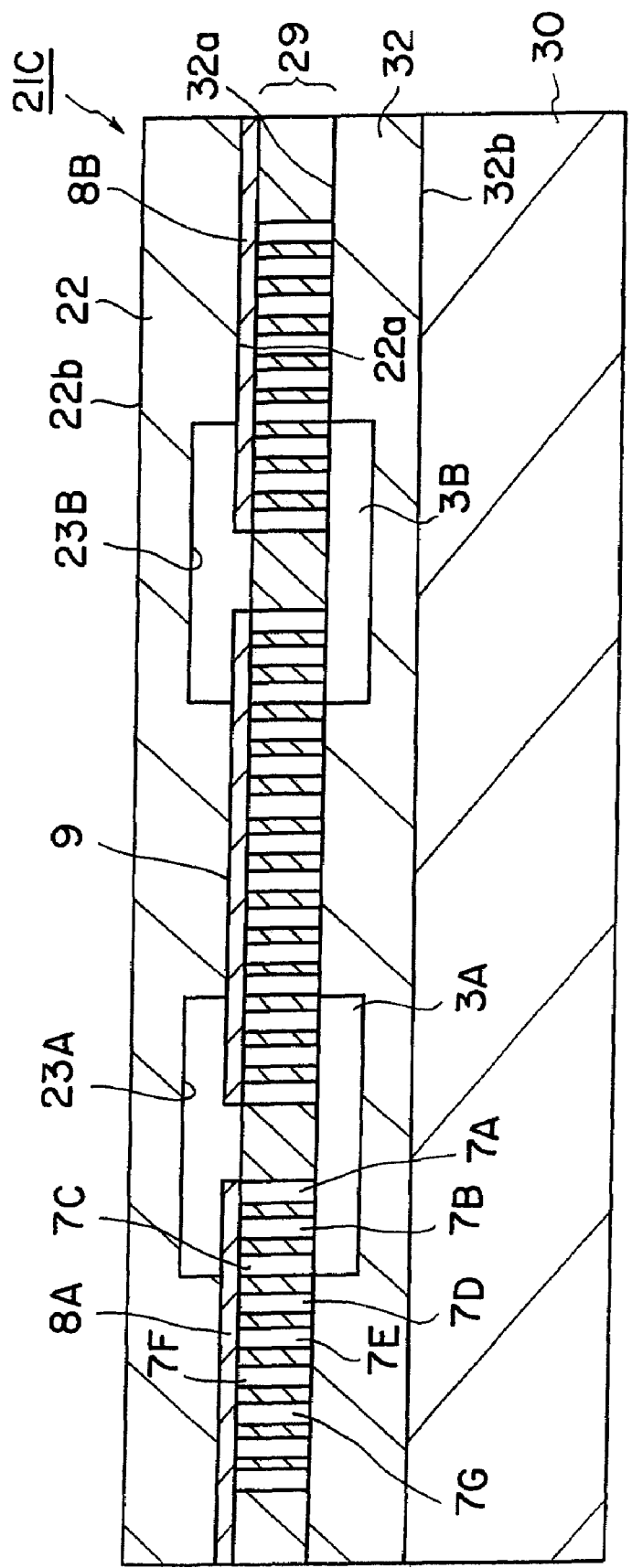
FIG. 11 is a cross sectional view schematically showing an optical functional device 21C according to still another embodiment of the present invention, having an optical waveguide of Mach-Zehnder type.
Figure 12:
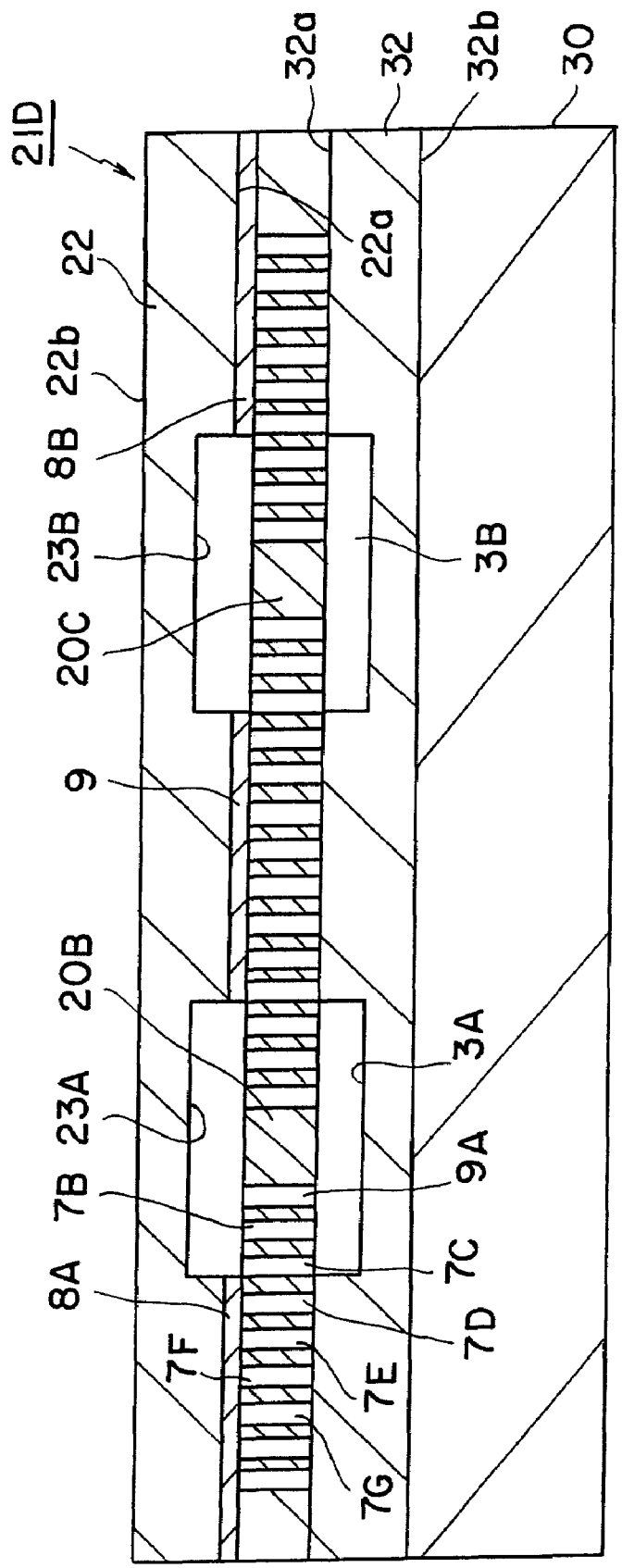
FIG. 12 is a cross sectional view schematically showing an optical functional device 21D according to still another embodiment of the present invention, having an optical waveguide of Mach-Zehnder type.

FIG. 11 relates to this embodiment. According to a device 21C shown in FIG. 11, a layer 32 of high dielectric constant is joined to and integrated with the side of the back face 4b of the dielectric layer 4. Predetermined low dielectric portions 3A and 3B are formed on the side of the upper face 32a of the layer 32 of high dielectric constant. The waveguide portion 20B faces the low dielectric portion 3A and the waveguide portion 20C faces the low dielectric portion 3B. At the same time, the low dielectric portions 3A and 3B are present under the lattice columns 7A, 7B and 7C positioned in the first to third columns with respect to the waveguide portions 20B and 20C, respectively. According to the present example, the low dielectric portions 3A and 3B are not present and the layers 32 of high dielectric constant are provided under the lattice columns 7D, 7E and so on of the fourth or higher order in distance with respect to the waveguide portions 20A and 20B, respectively. At the same time, the back face 32b of the layer 32 of high dielectric constant is joined with a supporting body 30.

According to the example of FIG. 11, the ground electrodes 8A, 8B and the signal electrode 9 face the low dielectric portions 23A and 23B, respectively. According to a device 21D shown in FIG. 12, however, the lattice columns of at least first to third orders in distance with respect to the waveguide portion 20B are not covered so that the ground electrode 8A and signal electrode 9 are not exposed to the low dielectric portion 23A. Further, the lattice columns of at least first to third orders in distance with respect to the waveguide portion 20C are not covered so that the ground electrode 8B and signal electrode 9 are not exposed to the low dielectric portion 23B.

EXAMPLES

Figure 13:
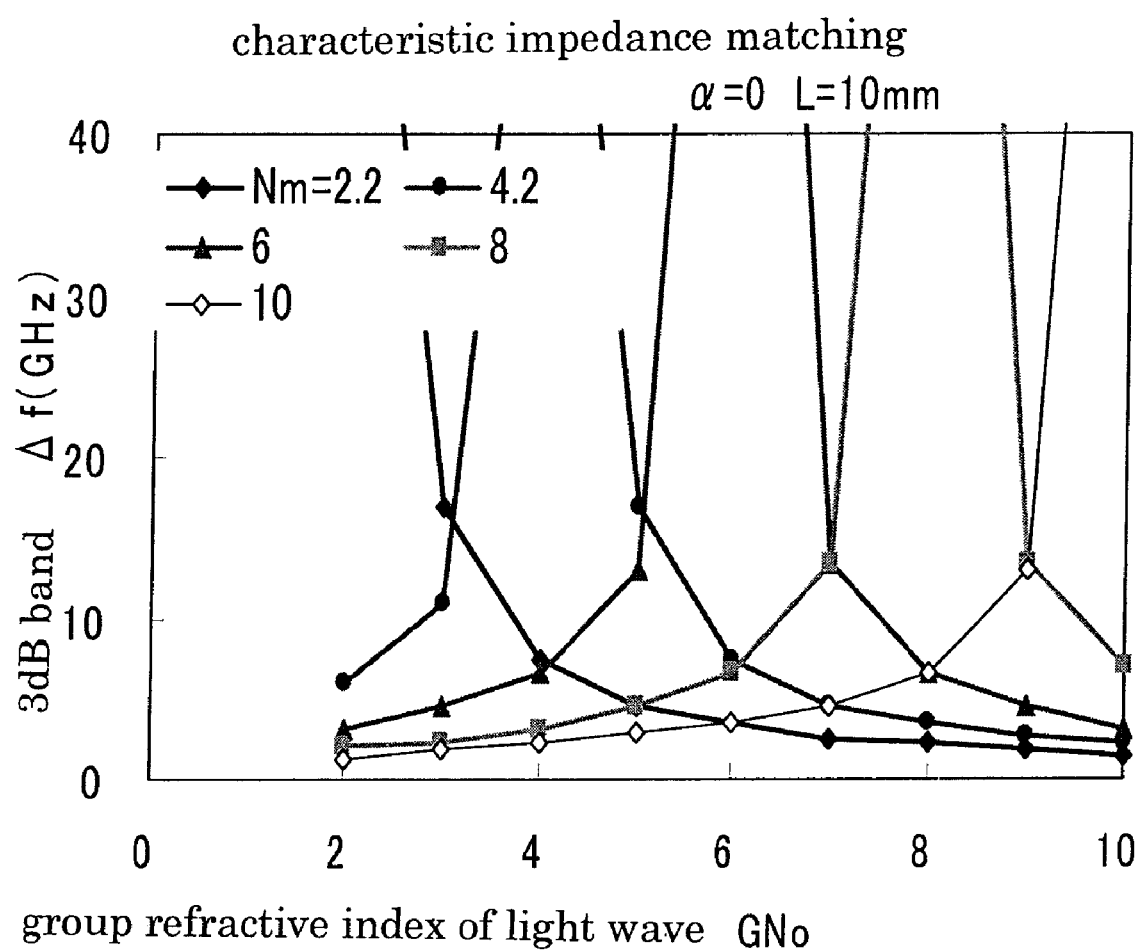
FIG. 13 is a graph showing the relationship of group refractive index of light wave, 3 dB band and refractive index Nm of microwave.

FIG. 13 shows the relationship of the group refractive index GNo (horizontal axis) of an optical waveguide of a photonic crystal device and 3 dB band Δf due to the velocity mismatch with the effective refractive index Nm of electrodes. This shows the example where the electrode length L is 10 mm. A prior example of Nm=2 is also shown. In the prior case, Δf is lower than 10 GHz where GNo is 4 or more. It is necessary to elevate Nm to 3 or more for widening the band to 10 GHz or higher. According to the present invention, Nm can be increased by the constitution described above, so that Nm can be made nearer to GNo of the photonic crystal.

Example 1

Figure 14:
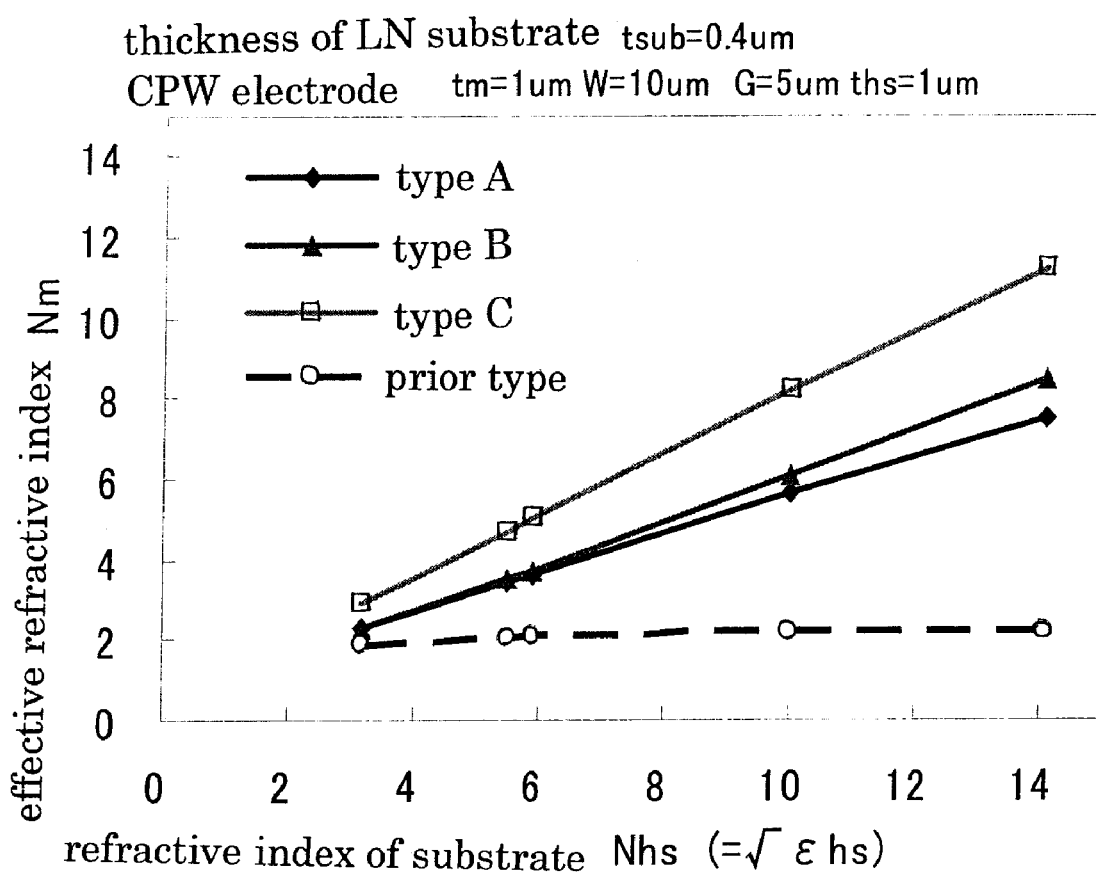
FIG. 14 is a graph showing the relationship of the refractive index of the layer of high refractive index (substrate) and the effective refractive index Nm of microwave.

The optical modulating devices of the examples of FIGS. 8, 9 and 10 were tested. It was further tested for an optical modulator that the layer of high dielectric constant was not provided under the lattice columns in FIG. 8. The effective refractive index Nm of microwave applied on the modulating electrodes was calculated by simulation for each device. It was provided that the dielectric layer 4 was made of lithium niobate single crystal and the refractive index Nhs of the layer 2 (substrate) of high refractive index was changed as shown in FIG. 14. The results were shown in FIG. 14. Further, the parameters were as follows.

Optical modulator of FIG. 8: type A
Optical modulator of FIG. 9: type B
Optical modulator of FIG. 10: type C
Optical modulator that the layer of high dielectric constant is not provided
under the lattice column: prior type
Thickness tsub of dielectric film slab: 0.4 μm
Thickness tm of ground and signal electrodes: 1 μm
Width W of signal electrode: 10 μm
Width G of low dielectric portion: 5 μm
Depth ths of low dielectric portion: 1 μm As can be seen from the above results, the effective refractive index of of microwave can be considerably improved according to the present invention. Especially, the effective refractive index of microwave can be further improved by providing the layers of high dielectric constant on the upper and lower sides of the slab-type and two-dimensional photonic crystal layer, respectively (type C: FIG. 10).

Example 2

The dependency of the effective refractive index Nm of microwave on (WgI−G)/2(=ΔWgI) was tested for the optical modulator of FIG. 10. WgI represents the width of the low dielectric portion, and G represents the electrode gap and 5 μm. The width W of the central and signal electrode was made 10 μm, 20 μm or infinite value. ΔWgI is an indicator showing the distance of the layer of high dielectric constant and the electrode edge viewed horizontally.

Figure 15:
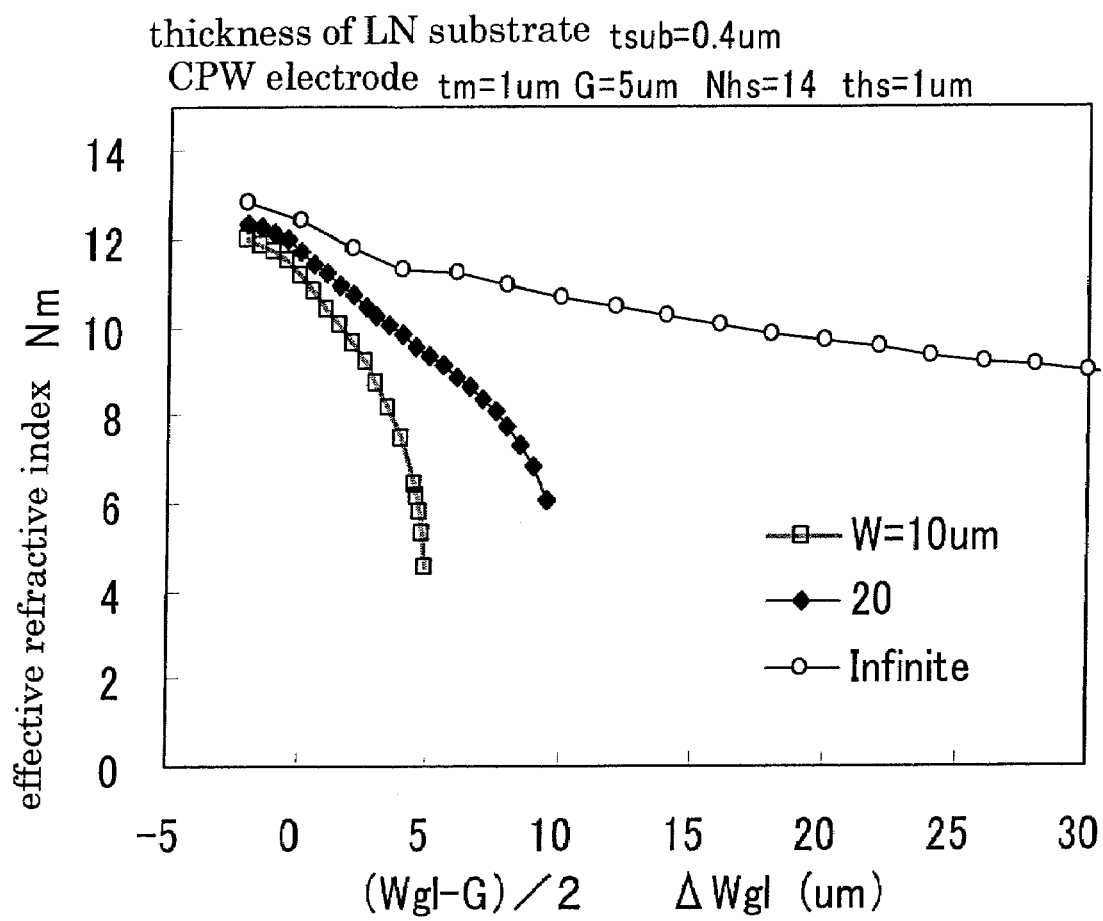
FIG. 15 is a graph showing the relationship of $\Delta$WgI, the effective refractive index Nm of microwave and electrode width W.

The effective refractive index Nm of microwave applied on the modulating electrodes was calculated by simulation for this device. It was provided that the dielectric layer 4 was made of lithium niobate single crystal. The parameters were as follows. The results were shown in FIG. 15.

Thickness tsub of dielectric layer: 0.4 μm
Thickness of ground and signal electrodes: 1 μm Electrode gap G: 5 µm
Width W of signal electrode: 10 µm, 20 µm or infinite value
Width WgI of low dielectric portion: 5 µm
Depth ths of low dielectric portion: 1 µm As a result, it was proved that the advantageous effects of the present invention can be obtained when ΔWgI is about minus 3 µm to about plus 3 µm as well as the case that ΔWgI is 0 µm. This means that the effects of the present invention were confirmed even when the layer of high dielectric constant is retreated to a some degree with respect to the waveguide portion.

Example 3

Figure 16:
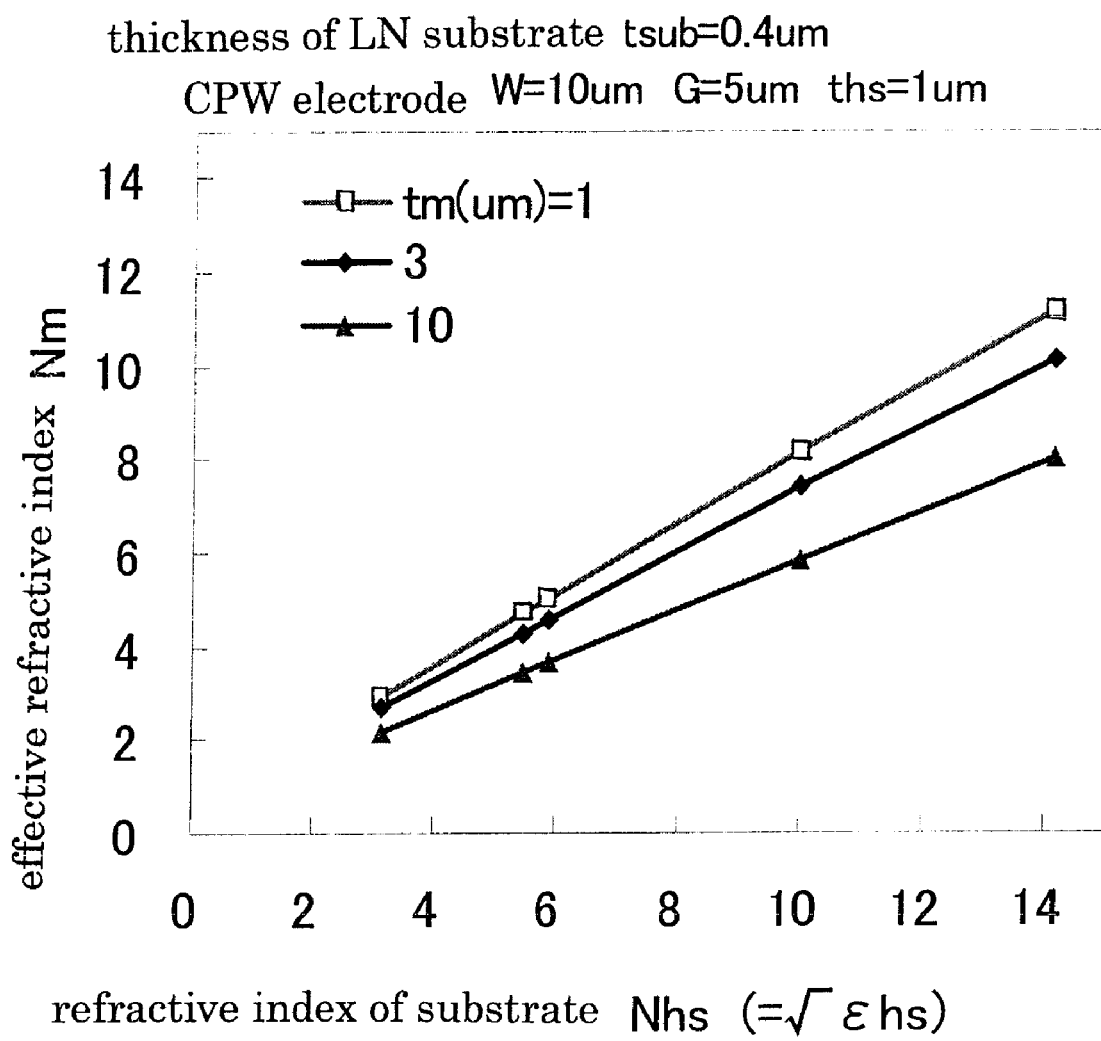
FIG. 16 is a graph showing the relationship of the refractive index of the substrate, the effective refractive index Nm of microwave and the electrode thickness tm.

The dependency of the refractive index Nm of microwave on the thickness tm of of the ground and signal electrodes was tested for the optical modulator of FIG. 10. The effective refractive index Nm of microwave applied on the modulating electrodes was calculated by simulation for this device. It was provided that the dielectric layer 4 was made of lithium niobate single crystal. The parameters were as follows. The results were shown in FIG. 16.
Thickness tsub of dielectric layer: 0.4 µm
Thickness tm of ground and signal electrodes: 1, 3 or 10 µm
Electrode gap: 5 µm
Width W of signal electrode: 10 µm
Width WgI of low dielectric portion: 5 µm
Depth ths of low dielectric portion: 1 µm As a result, it was proved that the effective refractive index of microwave can be further improved by lowering the thickness tm of the ground and signal electrodes. On this viewpoint, the thickness tm of the ground or signal electrode may preferably be 10 µm or smaller and more preferably be 5 µm or smaller.

Example 4

Figure 17:
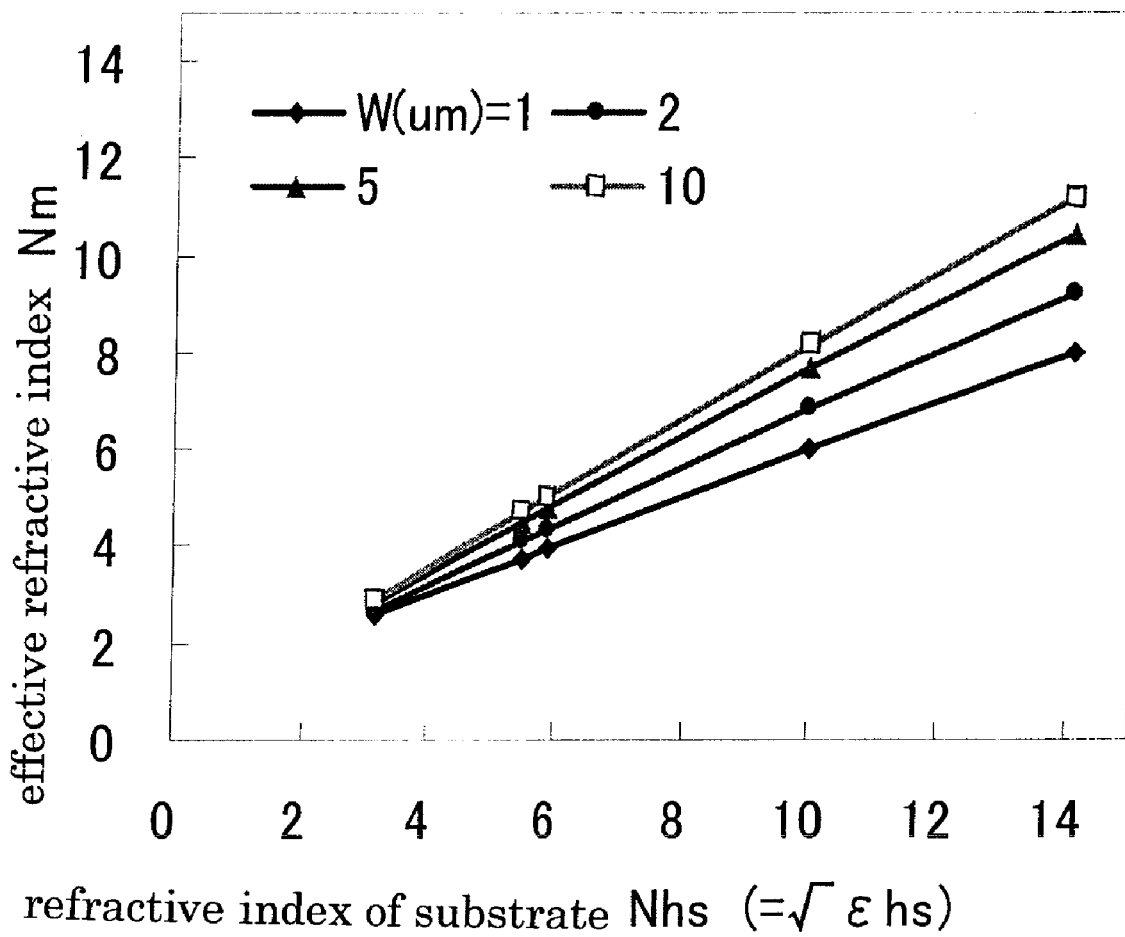
FIG. 17 is a graph showing the relationship of the refractive index of substrate, the effective refractive index Nm of microwave and the electrode width W.

The dependency of the refractive index Nm of microwave on the width W of the signal electrode was tested for the optical modulator of FIG. 10. The effective refractive index Nm of microwave applied on the modulating electrodes was calculated by simulation for this device. It was provided that the dielectric layer 4 was made of lithium niobate single crystal. The parameters were as follows. The results were shown in FIG. 17.
Thickness tsub of dielectric layer: 0.4 µm
Thickness tm of ground and signal electrodes: 1 µm
Electrode gap: 5 µm
Width W of signal electrode: 1, 2, 5 or 10 µm
Width WgI of low dielectric portion: 5 µm
Depth ths of low dielectric portion: 1 µm As a result, it was proved that the effective refractive index of microwave can be further improved by increasing the width W of the signal electrode.

Example 5

Figure 18:
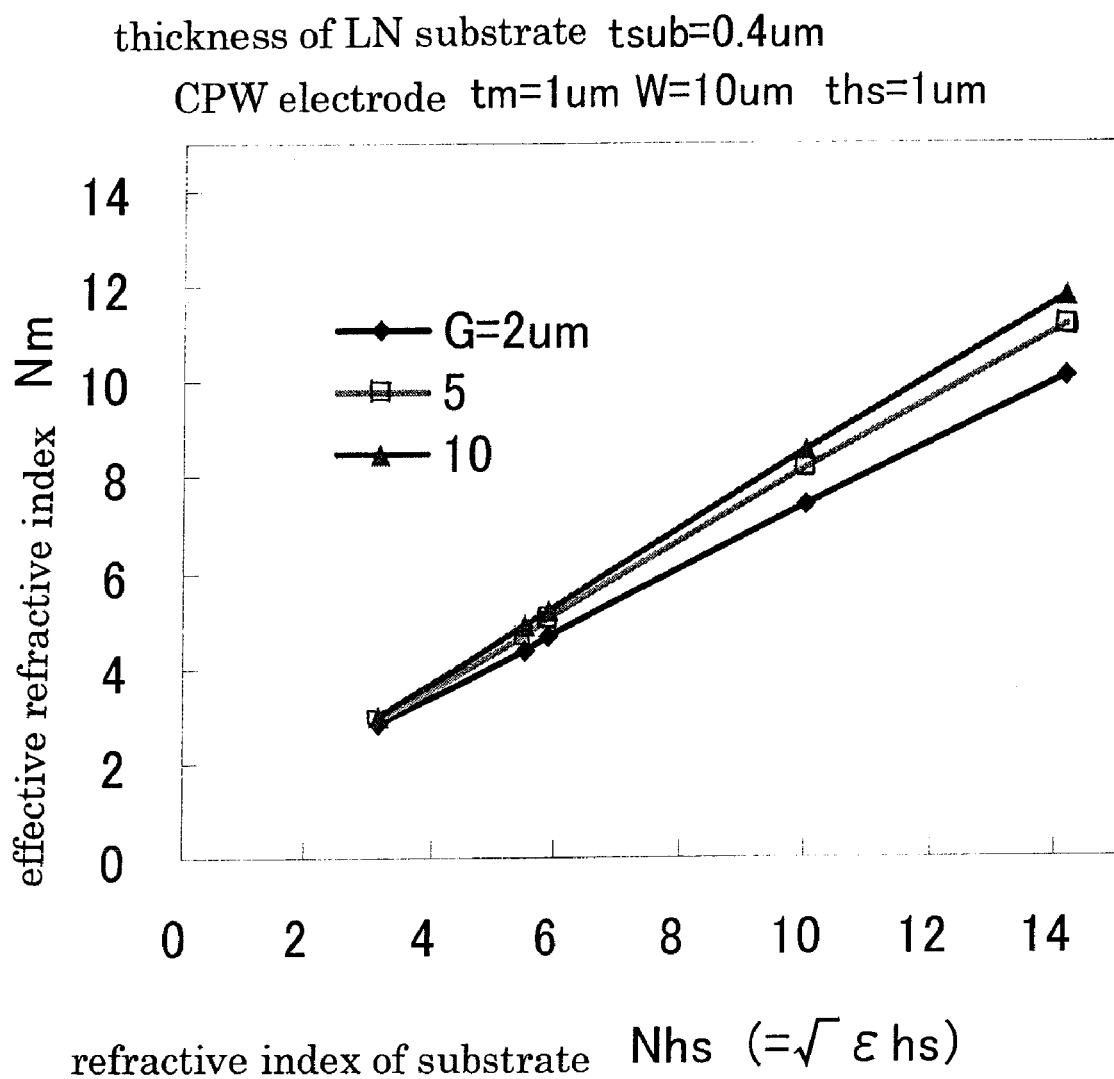
FIG. 18 is a graph showing the relationship of the refractive index of substrate, the effective refractive index Nm of microwave and the electrode gap G.

The dependency of the refractive index Nm of microwave on the electrode gap G was tested for the optical modulator of FIG. 10. The effective refractive index Nm of microwave applied on the modulating electrodes was calculated by simulation for this device. It was provided that the dielectric layer 4 was made of lithium niobate single crystal. The parameters were as follows. The results were shown in FIG. 18.
Thickness tsub of dielectric layer: 0.4 µm
Thickness tm of ground and signal electrodes: 1 µm
Electrode gap: 2, 5, 10 µm
Width W of signal electrode: 10 µm
Width WgI of low dielectric portion: 5 µm
Depth ths of low dielectric portion: 1 µm As a result, it was proved that the effective refractive index of microwave can be further improved by increasing the electrode gap G. On the viewpoint, the electrode gap G may preferably be 2 µm or larger and more preferably be 5 µm or larger.

Example 6

Figure 19:
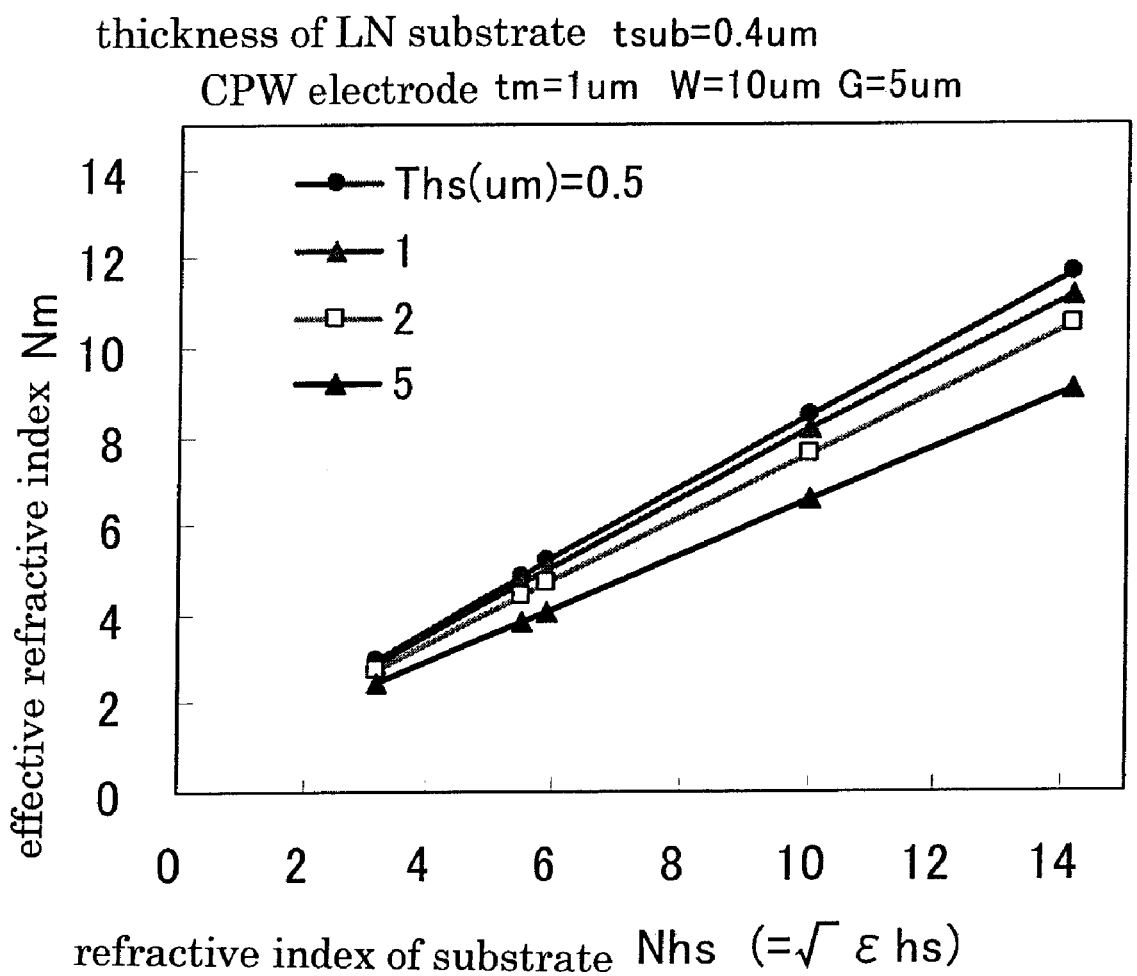
FIG. 19 is a graph showing the relationship of the refractive index of substrate, the effective refractive index Nm of microwave and the depth ths of the low dielectric portion.

The dependency of the refractive index Nm of microwave on the depth Ths of the groove formed in the dielectric layer was tested for the optical modulator of FIG. 10. The effective refractive index Nm of microwave applied on the modulating electrodes was calculated by simulation for this device. It was provided that the dielectric layer 4 was made of lithium niobate single crystal. The parameters were as follows. The results were shown in FIG. 19.
Thickness tsub of dielectric layer: 0.4 µm
Thickness tm of ground and signal electrodes: 1 µm
Electrode gap: 5 µm
Width W of signal electrode: 10 µm
Width WgI of low dielectric portion: 5 µm
Depth ths of low dielectric portion: 0.5, 1, 2 or 5 µm As a result, it was proved that the effective refractive index of microwave can be further improved by reducing the depth Ths of the low dielectric portion. On the viewpoint, the depth Ths of the low dielectric portion may preferably be 5 µm or smaller and more preferably be 2 µm or smaller.

The invention claimed is:

1. An optical functional device comprising:
   a slab type two-dimensional photonic crystal layer comprising a dielectric layer having a dielectric constant, a plurality of lattice columns each comprising dielectric pillars and a waveguide portion formed in said photonic crystal layer;
   a ground electrode and a signal electrode formed on said dielectric layer and for applying a modulating voltage on light propagating in said waveguide portion;
   a high dielectric layer laminated on said dielectric layer and having a first dielectric constant higher than that of said dielectric layer; and
   a low dielectric portion provided over or under said waveguide portion and said lattice columns of at least first, second and third orders in distance with respect to said waveguide portion, said low dielectric portion having a second dielectric constant lower than said first dielectric constant,
   wherein said low dielectric portion is formed within said high dielectric layer.

2. The optical functional device of claim 1, wherein said ground and signal electrodes do not contact said slab type two-dimensional photonic crystal layer.

3. The optical functional device of claim 1, further comprising a buffer layer provided between said photonic crystal layer and said ground electrode and between said photonic crystal layer and said signal electrode.

4. The optical functional device of claim 1, wherein said ground electrode and said signal electrode are provided on said lattice column of sixth or higher order in distance with respect to said waveguide portion.

5. The optical functional device of claim 1, wherein said lattice columns are not provided under said ground electrode and said signal electrode.

6. The optical functional device of claim 5, wherein said lattice columns do not comprises a lattice column of sixth order or higher order in distance with respect to said waveguide portion.

7. The optical functional device of claim 1, wherein said dielectric layer and said high dielectric layer are formed of a single bulk body.

8. The optical functional device of claim 1, comprising at least one pair of said ground electrodes and at least one pair of said waveguide portions, wherein said pair of waveguide portions constitutes a Mach-Zehnder type optical waveguide, and wherein said modulating voltage applied on each of said waveguide portions is controlled to regulate light propagating through each of said waveguide portions.

9. The optical functional device of claim 1, wherein said first dielectric constant is 5 or greater.

10. The optical functional device of claim 1, wherein said second dielectric constant is lower than that of said dielectric layer.

* * * * *